US009237440B2

(12) United States Patent
Geirhofer et al.

(10) Patent No.: US 9,237,440 B2
(45) Date of Patent: Jan. 12, 2016

(54) METHODS AND APPARATUS FOR RESOLVING AMBIGUOUS USER EQUIPMENT (UE) CAPABILITY SIGNALING

(71) Applicant: QUALCOMM Incorporated, San Diego, CA (US)

(72) Inventors: Stefan Geirhofer, Brooklyn, NY (US); Wanshi Chen, San Diego, CA (US); Peter Gaal, San Diego, CA (US); Hao Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 105 days.

(21) Appl. No.: 14/084,804

(22) Filed: Nov. 20, 2013

(65) Prior Publication Data
US 2014/0204848 A1 Jul. 24, 2014

Related U.S. Application Data

(60) Provisional application No. 61/754,407, filed on Jan. 18, 2013.

(51) Int. Cl.
*H04W 8/24* (2009.01)
*H04B 7/06* (2006.01)
(Continued)

(52) U.S. Cl.
CPC .............. *H04W 8/24* (2013.01); *H04B 7/0628* (2013.01); *H04B 7/024* (2013.01); *H04B 7/0413* (2013.01)

(58) Field of Classification Search
None
See application file for complete search history.

(56) References Cited

U.S. PATENT DOCUMENTS 6,600,917 B1 7/2003 Maupin
2012/0008557 A1* 1/2012 Wu ............................... 370/328
2012/0063358 A1 3/2012 Etemad
(Continued)

FOREIGN PATENT DOCUMENTS

WO WO-2012141634 A1 10/2012

OTHER PUBLICATIONS

"3rd Generation Partnership Project; Te chnical Specification Group Radio Access Network; Evolved Universal Terrestrial Radio Access (E-UTRA); User Equipment (UE) radio access capabilities (Release 11)", 3GPP Standard; 3GPP TS 36.306, 3rd Generation Partnership Project (3GPP), Mobile Competence Centre; 650, Route Des Lucioles; F-06921 Sophia-Antipolis Cedex; France, vol. RAN WG2, No. V11.2.0, Jan. 3, 2013, pp. 1-26, XP050691602.
(Continued)

*Primary Examiner* — Benjamin H Elliott, IV
(74) *Attorney, Agent, or Firm* — Patterson & Sheridan, LLP

(57) ABSTRACT

Certain aspects of the present disclosure generally relate to resolving ambiguous user equipment (UE) capability signaling. According to certain aspects, a method for wireless communications by a UE is provided. The method generally includes determining capabilities of the UE to support at least one of multiple-input multiple-output (MIMO) or coordinated multipoint (CoMP) features on different operating frequency bands of a radio access network (RAN), signaling, to a base station (BS) of the RAN, a first combination of capabilities of the UE for a combination of bands, signaling, to the BS, a second combination of capabilities, different than the first combination of capabilities, for the combination of bands, and identifying, based on or more criteria, a particular combination of capabilities to be used to communicate with the BS. In certain aspects, the UE may identify the combination of capabilities to use by applying a deterministic rule.

30 Claims, 6 Drawing Sheets

(51) Int. Cl.
    *H04B 7/02*    (2006.01)
    *H04B 7/04*    (2006.01)

(56) References Cited

U.S. PATENT DOCUMENTS

| | | | |
|---|---|---|---|
| 2012/0087257 | A1 | 4/2012 | Larsson et al. |
| 2012/0113866 | A1 | 5/2012 | Tenny et al. |
| 2012/0282922 | A1 | 11/2012 | Fodor et al. |
| 2013/0064162 | A1* | 3/2013 | Phan et al. .................... 370/312 |
| 2014/0169317 | A1* | 6/2014 | Gao et al. ...................... 370/329 |
| 2014/0187283 | A1* | 7/2014 | Nimbalker et al. ......... 455/550.1 |
| 2014/0198680 | A1* | 7/2014 | Siomina et al. ............... 370/252 |
| 2014/0204848 | A1* | 7/2014 | Geirhofer et al. ............. 370/329 |

OTHER PUBLICATIONS

Huawei et al., "Way Forward on UE capability for the joint operation of downlink CoMP and CA", R1-125388, 3rd Generation Partnership Project (3GPP), Mobile Competence Centre; 650, Route Des Lucioles; F-06921 Sophia Anti Polis vol. RAN WG1, No. New Orleans, USA; 20121112-20121116, Nov. 16, 2012, XP050663226.
International Search Report and Written Opinion—PCT/US2013/071140—ISA/EPO—Feb. 6, 2014.
Mediatek Inc: "Discussion on UE MIMO capability for CA", 3GPP Draft; R4-104299, 3rd Generation Partnership Project (3GPP), Mobile Competence Centre; 650, Route Des Lucioles ; F-06921 Sophia-Antipolis Cedex; France, vol. RAN WG4, No. Jacksonville; 20101115, Nov. 9, 2010, XP050499492.

* cited by examiner

METHODS AND APPARATUS FOR RESOLVING AMBIGUOUS USER EQUIPMENT (UE) CAPABILITY SIGNALING

CLAIM OF PRIORITY UNDER 35 U.S.C. §119

This application claims benefit of U.S. Provisional Patent Application Ser. No. 61/754,407, filed Jan. 18, 2013, which is herein incorporated by reference in its entirety.

BACKGROUND

I. Field

Certain aspects of the present disclosure generally relate to wireless communications and, more particularly, to resolving ambiguous user equipment (UE) capability signaling.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, tablets, laptop computers, netbooks, smartbooks, ultrabooks, etc. A remote device is a device that operates without being directly controlled by humans. Some examples of remote devices include sensors, meters, location tags, etc. A remote device may communicate with a base station, another remote device, or some other entity. Machine type communication (MTC) refers to communication involving at least one remote device on at least one end of the communication.

SUMMARY

Certain aspects of the present disclosure generally relate to resolving ambiguous user equipment (UE) capability signaling.

Certain aspects of the present disclosure provide a method for wireless communications by a user equipment (UE). The method generally includes determining capabilities of the UE to support at least one of multiple-input multiple-output (MIMO) or coordinated multipoint (CoMP) features on different operating frequency bands of a radio access network (RAN), signaling, to a base station (BS) of the RAN, a first combination of capabilities of the UE for a combination of bands, signaling, to the BS, a second combination of capabilities, different than the first combination of capabilities, for the combination of bands, and identifying, based on one or more criteria, a particular combination of capabilities to be used to communicate with the BS.

Certain aspects of the present disclosure provide a method for wireless communications by a base station (BS). The method generally includes receiving, from a user equipment (UE), signaling indicating a first combination of capabilities of the UE to support at least one of multiple-input multiple-output (MIMO) or coordinated multipoint (CoMP) features on different operating frequency bands of a radio access network (RAN) for a combination of bands, receiving, from the UE, signaling indicating a second combination of capabilities of the UE to support at least one of MIMO or CoMP features on different operating frequency bands of a RAN, different than the first combination of capabilities, for the combination of bands, and identifying, based on one or more criteria, a particular combination of capabilities to be used to communicate with the UE.

Certain aspects also provide various apparatuses and program products for performing operations of the methods above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain aspects of the present disclosure generally relate to resolving ambiguous user equipment (UE) capability signaling. Ambiguous signaling may results when the UE signals to a base station (BS) a first combination of UE capabilities for a combination of bands and also signals a second, different, combination of capabilities for the same combination of bands. According to certain aspects, a particular combination of capabilities to be used to communicate with the BS may be identified by applying a deterministic rule to determine which combination of capabilities to use. For example, using the first signaled combination or a first alphabetically ordered combination. Alternatively, the network may signal a combination of capabilities to be used. The combination may be different than either of the combination signaled by the UE.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
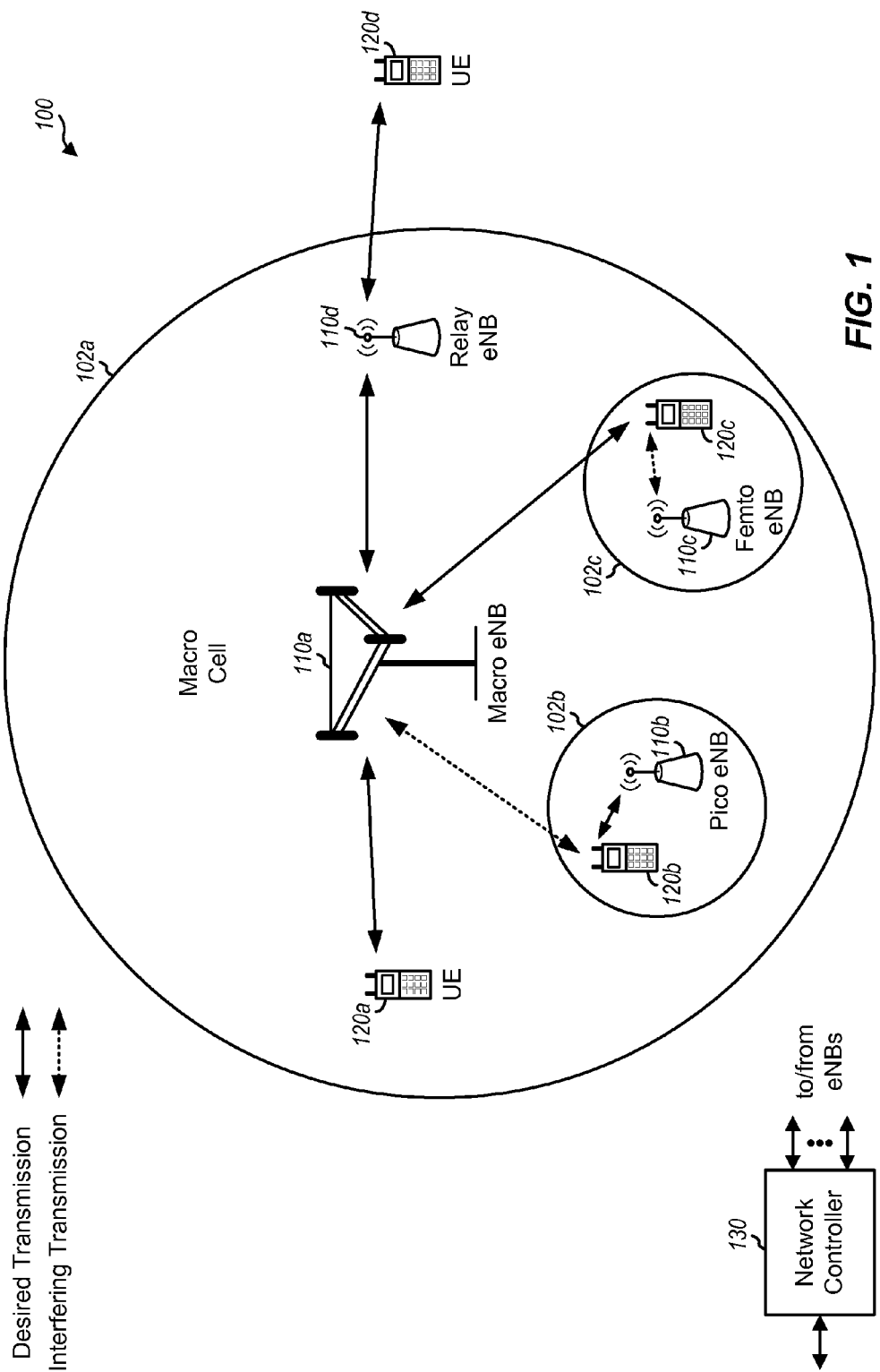
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c.

An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
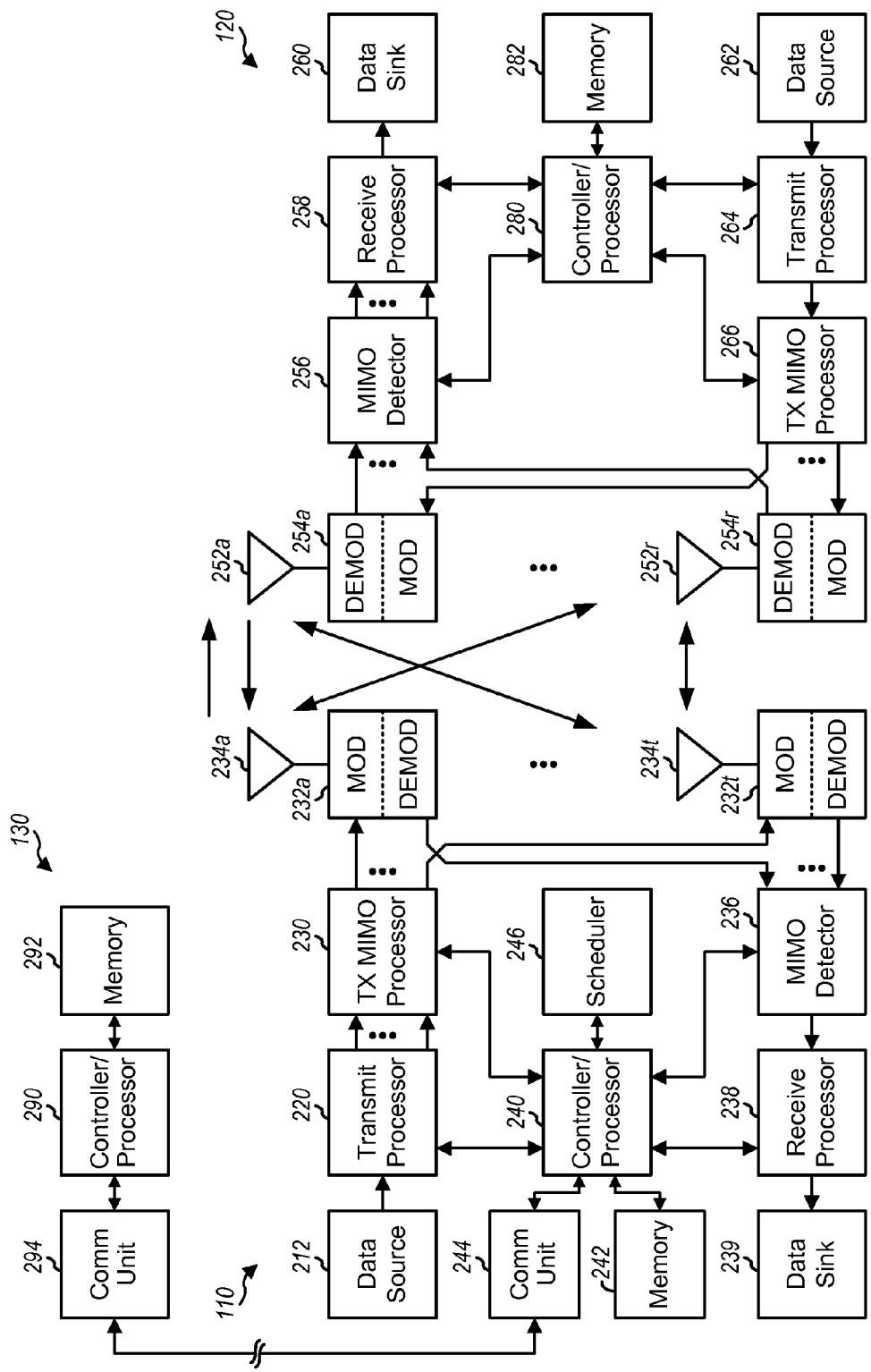
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general and At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
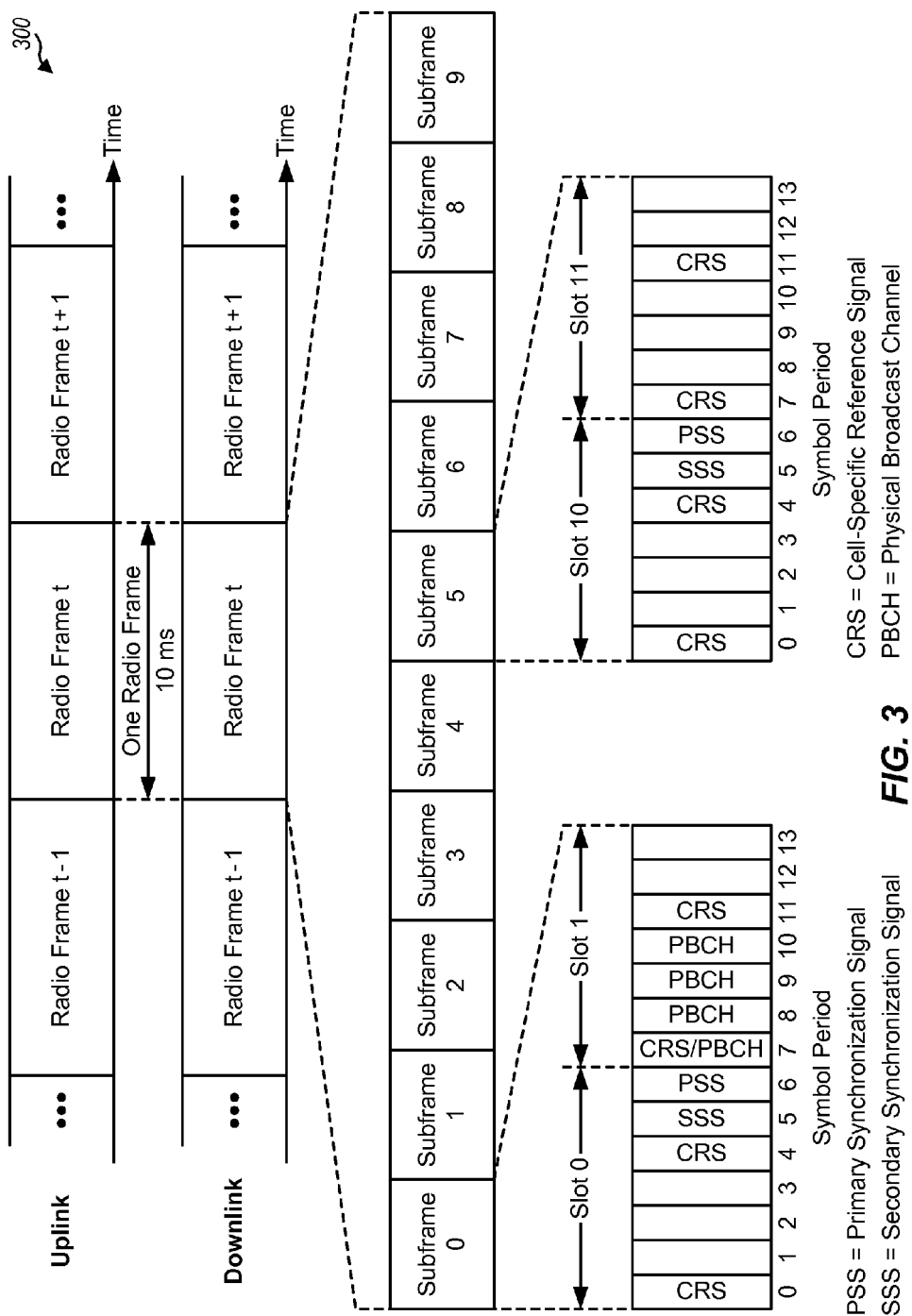
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Methods and Apparatus for Resolving Ambiguous User Equipment (UE) Capability Signaling User equipments (UEs) may signal their capabilities to the network to inform the network about specific features supported by the UEs. For example, a UE may signal the maximum number of multiple-input multiple-output (MIMO) layers supported for downlink (DL) reception. As another example, the UE may signal the maximum number of channel state information (CSI) processes supported in coordinated multipoint (CoMP). For CoMP with carrier aggregation (CA), the UE may signal the maximum number of CSI processes supported per component carrier (CC).

The maximum number of supported MIMO layers indicates the maximum number of supported layers for DL spatial multiplexing. The maximum number of supported MIMO layers may depend, for example, on the number of UE receive antennas, the UE processing capability, and other implementation specific factors. The network may use the number of layers signaled by the UE to determine the bitwidth for rank indicator (RI) signaling. For example, the bitwidth may be chosen as the maximum possible rank which is the minimum of the number of e Node B (eNB) antennas and UE receive antennas.

Figure 4:
FIG. 4 is a table illustrating example CSI feedback parameters, in accordance with certain aspects of the present disclosure.

In long term evolution (LTE) Release-11, the maximum number of supported CSI processes is a UE capability. The UE may indicate that it supports 1, 3, or 4 CSI processes. A CSI processes is defined as the association of a non-zero power (NZP) CSI reference signal (CSI-RS) resource for channel measurement and an interference measurement resource (IMR) for interference measurement. FIG. 4 is a table 400 illustrating example CSI feedback parameters, according to certain aspects of the present disclosure. CSI feedback related parameters are derived based on the signaled UE capability. As seen in FIG. 4, CSI feedback parameters may be determined based on the signaled UE capability on a per-CC basis.

Repeated UE capability signaling for the same band combination may lead to ambiguous behavior between the UE and the network. For carrier aggregation, the UE indicates the UE capability per band and band combination. For example, assuming a three band scenario: Band A, Band B, Band C and letting P denote the UE capability, the UE can signal different UE capabilities for different CA combinations. For CA of Band A and Band B, the UE may signal support of a first combination of UE capabilities $P_{11}$ and $P_{12}$. For CA of another combination of bands, Band A and Band C, the UE may signal support of a second combination of UE capabilities $P_{21}$ and $P_{22}$. $P_{11}$ may be different from $P_{21}$, and $P_{12}$ may be different from $P_{22}$, although both correspond to a CC in Band A (e.g., to signal that the UE supports a higher UE capability one either of the two bands but not both).

As another example, the UE may signal multiple capabilities for the same band combination. For CA of Band A and Band B, the UE may signal support for a combination of UE capabilities $P_{31}$ and $P_{32}$. For the same CA of the same band, Band A, and Band B, the UE may signal support for a second, different, combination of UE capabilities $P_{41}$ and $P_{42}$. One use case for signaling different UE capabilities for the same CA combination is to indicate that a higher capability can be supported on either Band A or Band B, but not both.

Such signaling leads to ambiguity between the UE and network, as the UE may not know which of the two pairs of UE capabilities was used at the network.

For example, for CA of Band A and Band B, the UE supports a first combination of UE capabilities $P_{11}$, $P_{12}$ if there is no intra-band CA within each band. Alternatively, if there is intra-band CA within at least one band (e.g., Band A, 2 CCs, and Band B, one CC), the UE supports the combination of UE capabilities $P_{21}$, $P_{22}$. In this case, if not explicitly specified, it may be unclear whether or not system parameters are to be derived as a function of the number of configured CCs.

As another example of UE-capability ambiguity, the UE signals the following for its capability of maximum number of spatial layers:
(Band A, Band B)→($N_{11}^{lay}=2$, $N_{12}^{lay}=4$) and
(Band A, Band B)→($N_{21}^{lay}=4$, $N_{22}^{lay}=2$).
The network configures two CCs and configures reference signals (RSs) (e.g., cell-specific reference signal (CRS) or CSI-RS) for four antenna ports on each CC. In this case, the UE cannot determine whether a maximum of four layers (the UE capability) should be supported on CC1 or CC2. The UE only knows that one of the two CCs could support such a value. Since the bitwidth of the RI report depends on this number, there is ambiguity as to which bitwidth should be used by the UE on CC1 and CC2, respectively.

Figure 5:
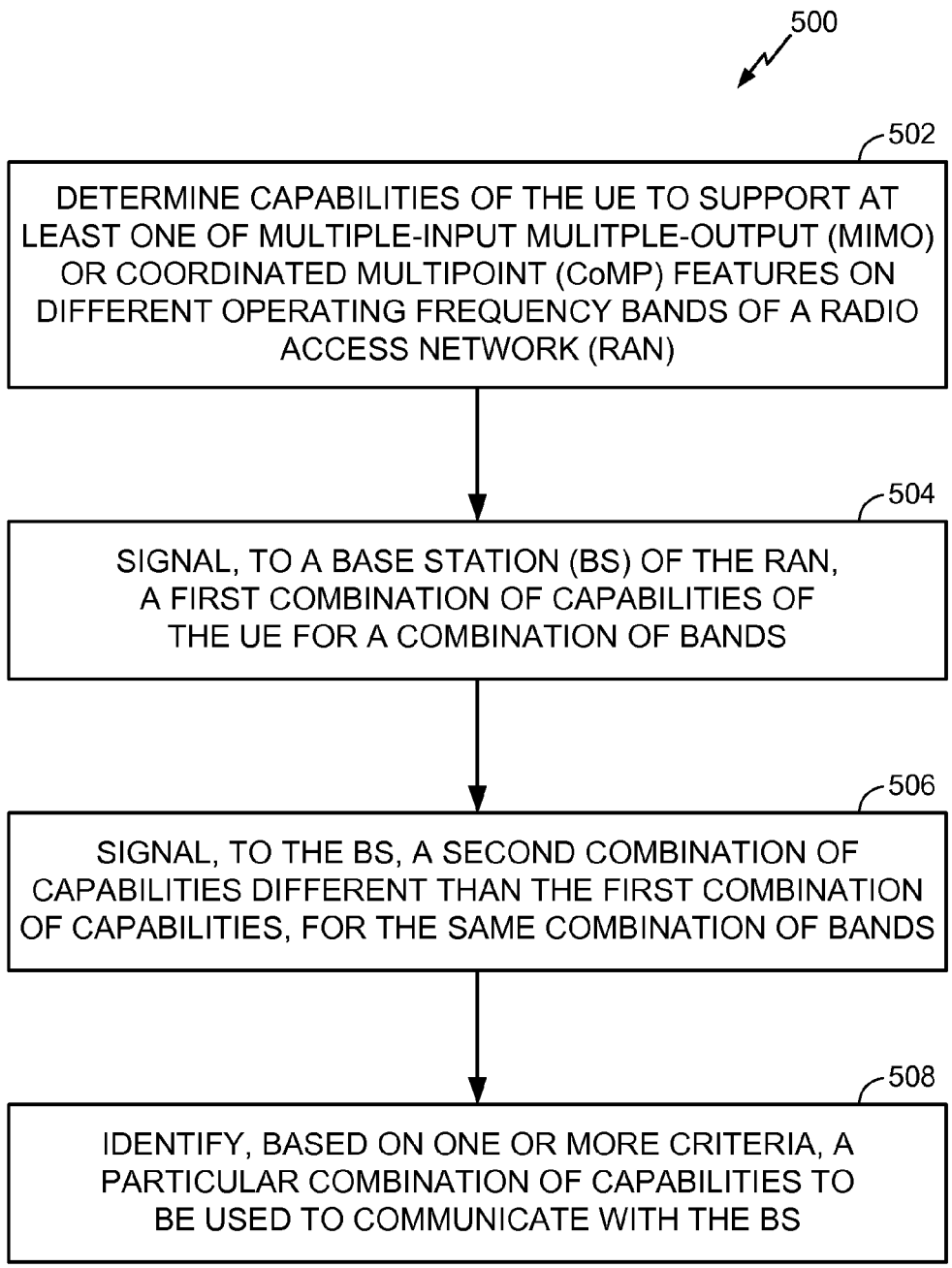
FIG. 5 illustrates example operations for wireless communications by a UE, in accordance with certain aspects of the present disclosure.

As yet another example of UE-capability ambiguity, the UE signals the following for its capability of CoMP CSI processes:
(Band A, Band B)→($P_{11}=3$, $P_{12}=4$) and
(Band A, Band B)→($P_{21}=4$, $P_{22}=3$).
The network configures 2 CC with $y_1=3$ CSI processes on CC1 and $y_2=3$ CSI processes on CC2. As shown in FIG. 5, for UE capability 3 and 4, the number of configured CSI processes is 2 or 3, and the timeline parameter is 5. However, for P=3, the triggering budget is 3 and for P=4 the triggering budget is 4. In this case, for frequency division duplexing (FDD), the UE cannot determine uniquely what value of the triggering budget should be assumed on CC1 and CC2.

Techniques and apparatus are provided herein, for resolving ambiguity in UE capability signaling.

According to certain aspects, for one solution, signaling of multiple UE capabilities for the same band combination is not allowed. Thus, the UE cannot signal multiple values of UE capabilities and ambiguity may be eliminated.

According to certain aspects, as another solution, when ambiguity occurs, the minimum common value across UE capabilities is used. For example, if the UE signals the following:
(Band A, Band B)→($P_{11}=3$, $P_{12}=4$) and
(Band A, Band B)→($P_{21}=4$, $P_{22}=3$), then
($\min(P_{11}, P_{21})=3$, $\min(P_{12}, P_{22})=3$)
is assumed as the resulting UE capability. Alternatively, the maximum value of the UE capability may be used in an analogous fashion. However, this solution may work for some types of UE capability (e.g., max number of MIMO layers) but not for others (e.g., max # of CSI processes). If the UE capability is UE complexity driven, taking the maximum may exceed the UE's computational resources.

According to certain aspects, as another solution, band combination may be selected according to a deterministic rule. For example, the first band combination that is signaled may always be selected. This rule may be a possible option if it is clear at both the UE and the network which band combination should be considered the "first."

In some embodiments, the list of band combinations may be ordered according to a deterministic rule, for example, alphabetically. Then the UE may select the first listed combination in the alphabetical list. This option may avoid ambiguity even if UE and network order/store UE capabilities differently. As used herein, alphabetical ordering implies sorting the band combinations first according to their first entry, then according to their second, third, etc.

According to certain aspects, for a fourth solution, the network may signal to the UE which of the ambiguous band combinations it has selected. For example, the network may inform the UE which band combination the UE should assume. Alternatively, the network may signal a new set of UE capabilities that are a combination of the ambiguous ones—but do not directly correspond to a single signaled band combination. In this case, the network may need to ensure that the new set of UE capabilities burdens the UE less than any of the ambiguous UE capabilities.

In another aspect, CA-dependent capability ambiguity may be resolved. The UE may signal the following for its capability of maximum number of spatial layers:
(Band A, Band B)→($N_{11}^{lay}=4$ if one CC, $N_{12}^{lay}=4$) and
(Band A, Band B)→($N_{21}^{lay}=2$ per CC if two or more CCs, $N_{22}^{lay}=4$),
if there is intra-band CA within Band A. In this case, it may be unclear how the bitwidth of RI on a CC in Band A should be determined (currently, the spec says RI bitwidth depends on eNB number Tx antennas and UE category). In a first alternative, RI bitwidth may be based on the total max number of layers in a band, regardless of how many CCs the UE is configured in the band—in the example provided, based on 4 layers. In a second alternative, RI bitwidth may further depend on how many carriers a UE is configured in a band. In this case, if one CC is configured on band A, the RI may be based on 4 layers. Alternatively, if two or more CCs are configured on band A, the RI may be based on 2 layers.

FIG. 5 illustrates example operations 500 for wireless communications by a user equipment (UE), in accordance with certain aspects of the present disclosure. At 502, the UE determines capabilities of the UE to support at least one of multiple-input multiple-output (MIMO) or coordinated multipoint (CoMP) features on different operating frequency bands of a radio access network (RAN). According to certain aspects, the UE capabilities may include a number of MIMO layers supported for DL reception or a number of CSI processes supported for channel feedback.

At 506, the UE signals, to a base station (BS) of the RAN, a first combination of capabilities of the UE for a combination of bands.

At 508, the UE signals, to the BS, a second combination of capabilities, different than the first combination of capabilities, for the combination of bands. According to certain aspects, the first combination of capabilities indicates a first set of capabilities supported for a first band and a second set of capabilities supported for a second band and the second combination of capabilities indicates a third set of capabilities, different than the first set, for the first band and a fourth set of capabilities, different than the second set, for the second band.

At 510, the UE identifies, based on one or more criteria, a particular combination of capabilities to be used to communicate with the BS. According to certain aspects, the UE may identify the combination of capabilities by taking a minimum common value for one or more capabilities in each of the first and second sets. Alternatively, the UE may take a maximum common value. According to certain aspects, the UE may identify the combination of capabilities to use by applying a deterministic rule. For example, the rule may be based on an order in which the combinations of capabilities were signaled. Alternatively, the rule may be based on an ordered list of band combinations, independent of an order in which the combinations of capabilities were signaled. According to certain aspects, the UE may receive signaling from the BS indicating the combination of capabilities to use. For some embodiments, the BS may signal a different combination of capabilities than either the first or second combinations of capabilities.

Figure 6:
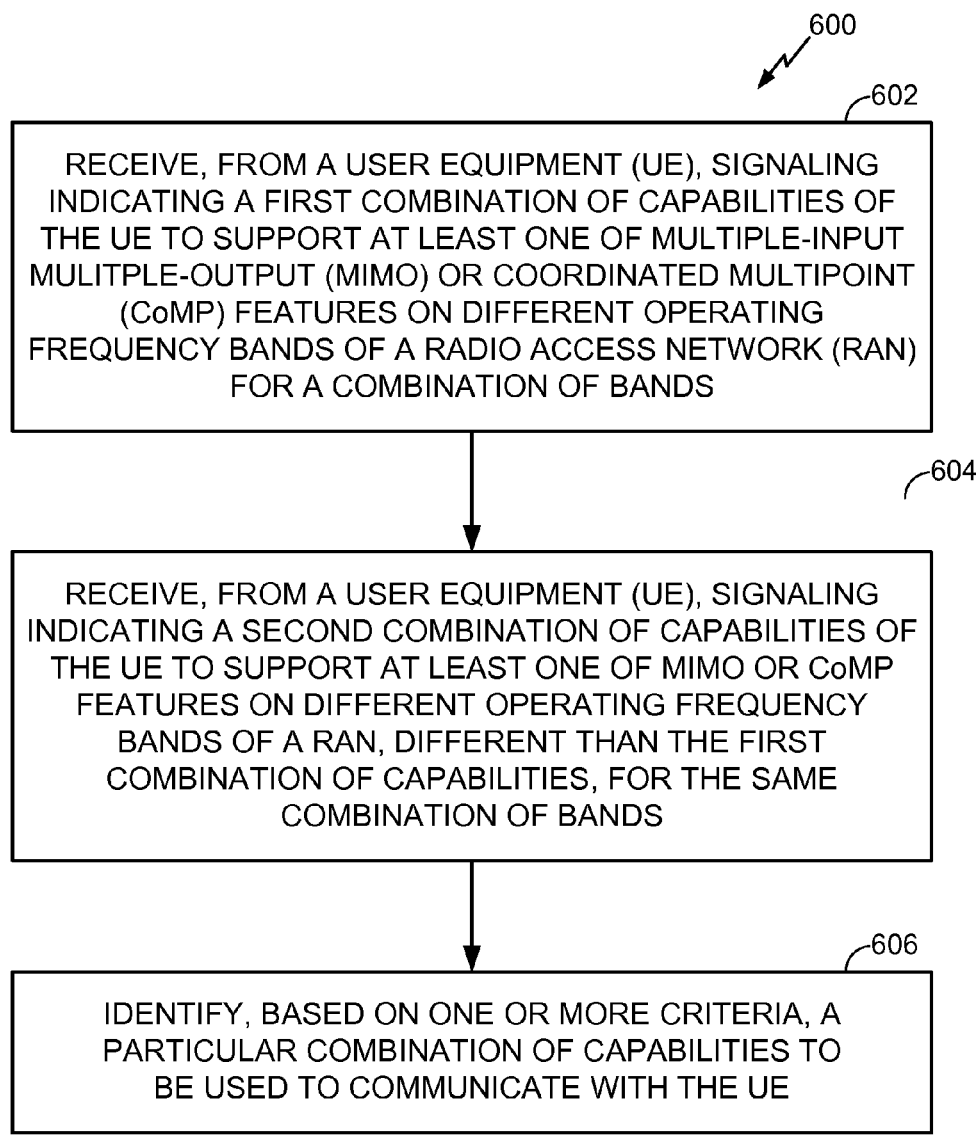
FIG. 6 illustrates example operations for wireless communications by a base station (BS), in accordance with certain aspects of the present disclosure.

FIG. 6 illustrates example operations 600 for wireless communications by a base station (BS), in accordance with certain aspects of the present disclosure.

At 602, the BS receives, from a user equipment (UE), signaling indicating a first combination of capabilities of the UE to support at least one of multiple-input multiple-output (MIMO) or coordinated multipoint (CoMP) features on different operating frequency bands of a radio access network (RAN) for a combination of bands.

At 604, the BS receives, from the UE, signaling indicating a second combination of capabilities of the UE to support at least one of MIMO or CoMP features on different operating frequency bands of a RAN, different than the first combination of capabilities, for the combination of bands.

And at 606, the BS identifies, based on one or more criteria, a particular combination of capabilities to be used to communicate with the UE.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the disclosure, other and further aspects of the disclosure may be devised without departing from the basic scope thereof, and the scope thereof is determined by the claims that follow.

What is claimed is:

1. A method for wireless communications by a user equipment (UE), comprising:
   determining capabilities of the UE to support at least one of multiple-input multiple-output (MIMO) or coordinated multipoint (CoMP) features on different operating frequency bands of a radio access network (RAN);
   signaling, to a base station (BS) of the RAN, a first combination of capabilities of the UE for a combination of bands;
   signaling, to the BS, a second combination of capabilities of the UE, different than the first combination of capabilities, for the combination of bands; and
   identifying, based on one or more criteria, a particular combination of capabilities to be used to communicate with the BS.

2. The method of claim 1, wherein the capabilities comprise at least one of:
   a number of MIMO layers supported for downlink reception or a number of channel state information (CSI) processes supported for channel feedback.

3. The method of claim 2, wherein:
   the first combination of capabilities indicates a first set of capabilities supported for a first band and a second set of capabilities supported for a second band; and
   the second combination of capabilities indicates a third set of capabilities, different than the first set of capabilities, for the first band and a fourth set of capabilities, different than the second set of capabilities, for the second band.

4. The method of claim 1, wherein the identifying comprises:
   taking a minimum common value for one or more capabilities in each of the first combination of capabilities and the second combination of capabilities.

5. The method of claim 1, wherein the identifying comprises:
   taking a maximum common value for one or more capabilities in each of the first combination of capabilities and the second combination of capabilities.

6. The method of claim 1, wherein the identifying comprises:
   applying a deterministic rule to determine which of the first combination of capabilities or the second combination of capabilities to use.

7. The method of claim 6, wherein the deterministic rule is based on an order in which the first combination of capabilities and the second combination of capabilities were signaled.

8. The method of claim 6, wherein the deterministic rule is based on an ordered list of band combinations that is independent of an order in which the first combination of capabilities and the second combination of capabilities were signaled.

9. The method of claim 1, wherein the identifying comprises receiving, from the BS, signaling indicating a combination of capabilities to use.

10. The method of claim 9, wherein the received signaling indicates a different combination of capabilities than either the first combination of capabilities or the second combination of capabilities.

11. A method for wireless communications by a base station (BS), comprising:
    receiving, from a user equipment (UE), signaling indicating a first combination of capabilities of the UE to support at least one of multiple-input multiple-output (MIMO) or coordinated multipoint (CoMP) features on different operating frequency bands of a radio access network (RAN) for a combination of bands;
    receiving, from the UE, signaling indicating a second combination of capabilities of the UE to support at least one of MIMO or CoMP features on different operating frequency bands of a RAN, different than the first combination of capabilities, for the combination of bands; and
    identifying, based on one or more criteria, a particular combination of capabilities to be used to communicate with the UE.

12. The method of claim 11, wherein the capabilities comprise at least one of:

a number of MIMO layers supported for downlink reception or a number of channel state information (CSI) processes supported for channel feedback.

13. The method of claim 12, wherein:
the first combination of capabilities indicates a first set of capabilities supported for a first band and a second set of capabilities supported for a second band; and
the second combination of capabilities indicates a third set of capabilities, different than the first set of capabilities, for the first band and a fourth set of capabilities, different than the second set of capabilities, for the second band.

14. The method of claim 11, wherein the identifying comprises:
taking a minimum common value for one or more capabilities in each of the first combination of capabilities and the second combination of capabilities.

15. The method of claim 11, wherein the identifying comprises:
taking a maximum common value for one or more capabilities in each of the first combination of capabilities and the second combination of capabilities.

16. The method of claim 11, wherein the identifying comprises:
applying a deterministic rule to determine which of the first combination of capabilities or the second combination of capabilities to use.

17. The method of claim 16, wherein the deterministic rule is based on an order in which the first combination of capabilities and the second combination of capabilities were signaled.

18. The method of claim 16, wherein the deterministic rule is based on an ordered list of band combinations that is independent of an order in which the first combination of capabilities and the second combination of capabilities were signaled.

19. The method of claim 11, further comprising, signaling, to the UE, an indication of a combination of capabilities to use.

20. The method of claim 19, wherein the signaling indicates a different combination of capabilities than either the first combination of capabilities or the second combination of capabilities.

21. An apparatus for wireless communications by a user equipment (UE), comprising:
a processor;
memory in communication with the processor, the memory including instructions that are executable by the processor to:
determine capabilities of the UE to support at least one of multiple-input multiple-output (MIMO) or coordinated multipoint (CoMP) features on different operating frequency bands of a radio access network (RAN);
signal, to a base station (BS) of the RAN, a first combination of capabilities of the UE for a combination of bands;
signal, to the BS, a second combination of capabilities of the UE, different than the first combination of capabilities, for the combination of bands; and
identify, based on one or more criteria, a particular combination of capabilities to be used to communicate with the BS.

22. The apparatus of claim 21, wherein the capabilities comprise at least one of:
a number of MIMO layers supported for downlink reception or a number of channel state information (CSI) processes supported for channel feedback.

23. The apparatus of claim 22, wherein:
the first combination of capabilities indicates a first set of capabilities supported for a first band and a second set of capabilities supported for a second band; and
the second combination of capabilities indicates a third set of capabilities, different than the first set of capabilities, for the first band and a fourth set of capabilities, different than the second set of capabilities, for the second band.

24. The apparatus of claim 21, wherein the instructions for identifying are executable by the processor to:
take a minimum common value for one or more capabilities in each of the first combination of capabilities and the second combination of capabilities.

25. The apparatus of claim 21, wherein the instructions for identifying are executable by the processor to:
take a maximum common value for one or more capabilities in each of the first combination of capabilities and the second combination of capabilities.

26. An apparatus for wireless communications by a base station (BS), comprising:
a processor;
memory in communication with the processor, the memory including instructions that are executable by the processor to:
receive, from a user equipment (UE), signaling indicating a first combination of capabilities of the UE to support at least one of multiple-input multiple-output (MIMO) or coordinated multipoint (CoMP) features on different operating frequency bands of a radio access network (RAN) for a combination of bands;
receive, from the UE, signaling indicating a second combination of capabilities of the UE to support at least one of MIMO or CoMP features on different operating frequency bands of a RAN, different than the first combination of capabilities, for the combination of band; and
identify, based on one or more criteria, a particular combination of capabilities to be used to communicate with the UE.

27. The apparatus of claim 26, wherein the capabilities comprise at least one of:
a number of MIMO layers supported for downlink reception or a number of channel state information (CSI) processes supported for channel feedback.

28. The apparatus of claim 27, wherein:
the first combination of capabilities indicates a first set of capabilities supported for a first band and a second set of capabilities supported for a second band; and
the second combination of capabilities indicates a third set of capabilities, different than the first set of capabilities, for the first band and a fourth set of capabilities, different than the second set of capabilities, for the second band.

29. The apparatus of claim 26, wherein the instructions for identifying are executable by the processor to:
take a minimum common value for one or more capabilities in each of the first combination of capabilities and the second combination of capabilities.

30. The apparatus of claim 26, wherein the instructions for identifying are executable by the processor to:
take a maximum common value for one or more capabilities in each of the first combination of capabilities and the second combination of capabilities.

* * * * *